Dec. 9, 1958      J. S. DRYBREAD, SR      2,863,478
CORN CUTTER
Filed April 27, 1956      2 Sheets-Sheet 1
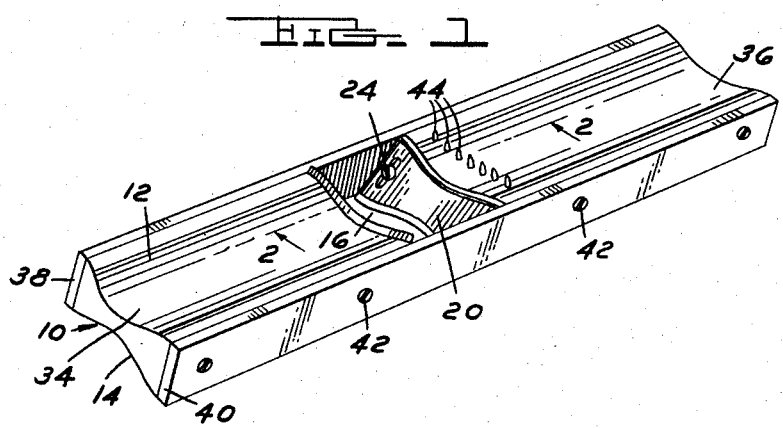
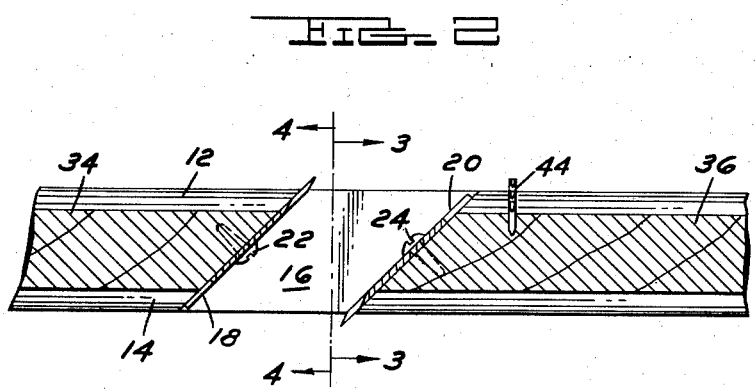
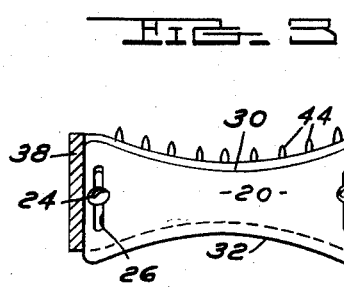 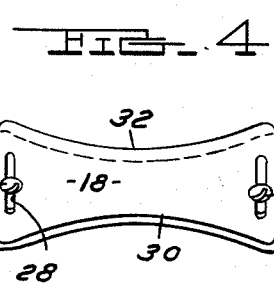
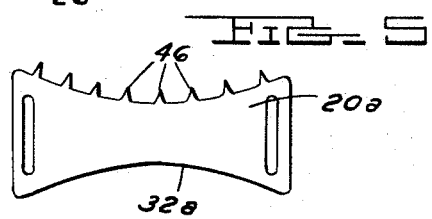
INVENTOR.
JOHN S. DRYBREAD SR.
BY
*Burton & Parker*
ATTORNEYS Dec. 9, 1958 J. S. DRYBREAD, SR 2,863,478
CORN CUTTER
Filed April 27, 1956 2 Sheets-Sheet 2
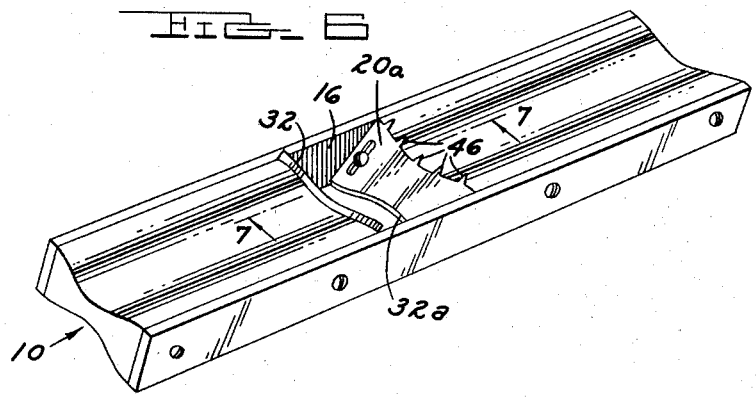
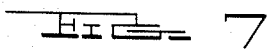
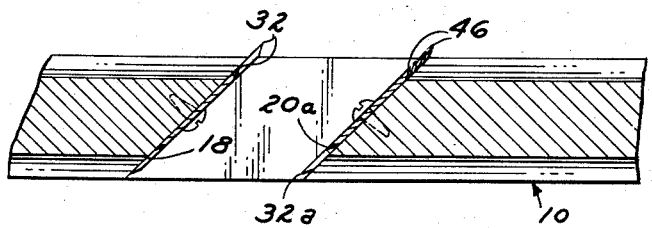
INVENTOR.
JOHN S. DRYBREAD SR.
BY Burton & Parker
ATTORNEYS 2,863,478

CORN CUTTER

John S. Drybread, Sr., Clawson, Mich., assignor of one-half to Berniece L. Drybread, Clawson, Mich.

Application April 27, 1956, Serial No. 581,130

1 Claim. (Cl. 146—4)

This invention relates to an improved device for cutting corn off of cobs.

An object of the invention is the provision of a device which will cut whole kernels of corn from the cobs of young sweet corn or the like without rupturing the kernels.

Another object of the invention is the provision of a device of the character mentioned which will, prior to cutting the corn from the cob, rupture the kernels to permit the juices therein to leak out, and immedaitely following rupturing of the kernels, cut them from the cob to create what may be termed cream style corn.

A further object of the invention is the provision of a corn cutter of the character mentioned which is manually operable in a simple and fool-proof manner to effect the cutting of both whole and ruptured kernels of young fresh corn from the cob and which may be manufactured at a low cost.

Other objects, advantages, and meritorious features will more fully appear from the specification, claims, and accompanying drawing, wherein:

Fig. 1 is a perspective view of a corn cutter embodying my invention;

Fig. 2 is a cross sectional view taken on the line 2—2 of Fig. 1;

Fig. 3 is a cross sectional view taken on the line 3—3 of Fig. 2;

Fig. 4 is a cross sectional view taken on the line 4—4 of Fig. 2;

Fig. 5 is a plan view of an alternative form of the cutting blade shown in Fig. 3;

Fig. 6 is a perspective view of a modified form of the corn cutter employing the blade shown in Fig. 5; and Fig. 7 is a cross-sectional view taken on the line 7—7 of Fig. 6.

An illustrative embodiment of my improved corn cutter is shown in Fig. 1. The cutter includes a body 10 of rectangular generally elongated shape, opposite faces of which are concave as at 12 and 14, forming corn cob receiving and guiding troughs or surfaces in the body. The body 10 intermediate its length is provided with an inclined aperture 16 opening through the opposite concave faces and with a pair of cutter blades 18 and 20 disposed within the aperture in parallel relation and overlying opposite inclined faces of the aperture. Securing means such as screws or the like 22 and 24 adjustably position and hold the blades within the aperture. The blades are preferably formed of hardened steel while the screws are preferably formed of non-corrosive metal, such as stainless steel.

Front views of the cutter blades 18 and 20 are shown in Figs. 3 and 4 respectively. It will be noted that the blades are provided with notches 26 and 28 through which the screws 22 and 24 extend to provide for adjustment of the blades. The opposite edges 30 and 32 of each blade are concave to conform to the concavity of the surfaces 12 and 14 of the body 10. Edge 32 of each blade is a beveled cutting edge, and by adjustment of screws 22 and 24, the edge may be set a determined distance above the surfaces 12 and 14 to effect the most suitable cutting action.

The body 10 comprises a pair of end members 34 and 36 connected together in endwise spaced relation by side rails 38 and 40, with the endwise spacing forming the aperture 16 in the body 10. The members 34 and 36 may be formed of hardwood, such as maple, while the rails may be formed of stainless steel or other suitable non-corrosive metal. On the other hand, the body may be fabricated as an integral or one-piece unit, either from a metal or plastic stamping or the like, with the blades 18 and 20 adjustably mounted thereon as heretofore described. When the body 10 is formed of separate pieces as shown in Fig. 1, the rails 38 and 40 may be connected to the end members 34 and 36 by non-corrosive screws or the like 42. The rails not only serve to tie the end members together but also protect the edges thereof and also serve to guide and hold the concave cutting edge 32 of the blades 18 and 20 in proper parallel relation with the concave surfaces 12 and 14 of the body.

One concave surface of the body is provided with a transversely extending row of sharpened pins 44 which bite into the kernels of corn on a cob moved along trough 12 and over the pins. The pins are preferably formed of stainless steel or the like and are driven into the body member with only the points exposed. It will be noted that the pins project from only one surface of the body and that the trough 14 is unobstructed by pins.

In the operation of my improved corn cutter, the cutter is placed to span the open top of a bowl, pan, or the like, in which the kernels cut from the cob are to be collected. Assuming that cream style corn is desired, the cutter is placed over the bowl such that the trough or surface 12 is uppermost as shown in Fig. 1, and aperture 16 is positioned centrally of the open mouth of the bowl or pan. Thereupon the operator grasps the cutter in one hand to hold it in place, and with the other hand places a cob of corn in trough 12 in end member 36, and slides the cob back and forth from end to end of the cutter. As the cob passes over the pins 44, the pins rupture the kernels, and thereafter the blade 18 cuts the kernels from the cob and they fall into the bowl or pan below aperture 16. At the end of each cycle of movement of the cob the operator rotates it slightly to present uncut kernels to the pins and blade 18. By turning the cutter over such that trough 14 is uppermost, whole kernels may be cut off without rupture and will fall through the aperture.

In a modification of my invention, shown in Figs. 5–7, the pins 44 are eliminated and instead one of the blades is provided at that edge opposite its cutting edge, with a plurality of teeth or the like which function in a manner similar to that of the pins. Such a blade is shown in Figs. 5–7 and indicated at 20a. Blade 20a would replace blade 20 shown in Fig. 2. In addition, the pins 44 shown in Fig. 2 would also be eliminated. The cutting edge of blade 20a is indicated at 32a. The teeth 46 of the blade are disposed along the opposite edge thereof from the cutting edge. When such a blade is incorporated in the corn cutter shown in Figs. 1–4, in lieu of blade 20, it will be understood that the pins 44 are unnecessary and are eliminated, and the teeth 46 perform the same function as the pins.

What I claim is:

A corn cutting device for the purpose described comprising: an elongated body member having opposite longitudinally extending concave surfaces, said body member provided with an aperture extending therethrough and opening at opposite ends through said concave surfaces, a pair of double-edge blades adjustably supported within said aperture in the body member in spaced-apart relation at opposite sides of the aperture with the blades extending transversely of the concave surfaces, one cutting edge of one of the blades being continuous and the other cutting edge comprising a plurality of spaced-apart teeth, said blades disposed in the body member such that the toothed cutting edge of the one and a continuous cutting edge of the other project beyond one concave surface of the body with the blades adjustable to project the opposite cutting edges beyond the other concave surface of the body member, and means connecting said blades to the body member for adjustable movement.

References Cited in the file of this patent

UNITED STATES PATENTS

| | | |
|---|---|---|
| 222,974 | Wood | Dec. 23, 1879 |
| 564,832 | McCown | July 28, 1896 |
| 593,052 | Keller | Nov. 2, 1897 |
| 1,041,049 | Elliott | Oct. 15, 1912 |